United States Patent [19]

Kolchinsky et al.

[11] 4,405,251

[45] Sep. 20, 1983

[54] RETAINING RING LOCKING DEVICE

[75] Inventors: Abel E. Kolchinsky, Glenview; John Bouilun; Wayne Davis, both of Bensenville, all of Ill.

[73] Assignee: Miller Fluid Power Corporation, Bensenville, Ill.

[21] Appl. No.: 339,872

[22] Filed: Jan. 18, 1982

Related U.S. Application Data

[63] Continuation of Ser. No. 128,358, Mar. 6, 1980.

[51] Int. Cl.³ ............................................... B25G 3/00
[52] U.S. Cl. ........................................ 403/9; 403/377; 403/326
[58] Field of Search .................. 403/326, 9, 6, 377, 403/DIG. 7; 285/321; 411/517

[56] References Cited

U.S. PATENT DOCUMENTS

| Re. 23,041 | 9/1948 | Smith . | |
|---|---|---|---|
| 1,464,386 | 8/1923 | Ingram | 285/277 |
| 2,038,869 | 4/1936 | Rader | 403/DIG. 7 |
| 2,152,681 | 4/1939 | Caminez . | |
| 2,341,670 | 2/1944 | Stinson . | |
| 2,401,912 | 6/1946 | Cram . | |
| 2,450,425 | 10/1948 | Frisby . | |
| 2,512,316 | 6/1950 | Eckener . | |
| 2,581,399 | 1/1952 | Forster . | |
| 2,760,258 | 8/1956 | Rieger | 285/321 X |
| 2,874,741 | 2/1959 | Braucato . | |
| 2,970,871 | 2/1961 | Flick . | |
| 3,177,782 | 4/1965 | Sampson . | |
| 3,214,204 | 10/1965 | Carter | 285/321 X |
| 3,343,460 | 9/1967 | Jones . | |
| 3,703,852 | 11/1972 | Morgan . | |

FOREIGN PATENT DOCUMENTS 752846  7/1956  United Kingdom .

Primary Examiner—Andrew V. Kundrat
Attorney, Agent, or Firm—Wood, Dalton, Phillips, Mason & Rowe

[57] ABSTRACT

A retaining ring locking device for preventing longitudinal relative movement of a shaft within a bore utilizes a flat or wire retaining ring. A groove is machined on the shaft as well as the bore and an access window is provided on either the shaft or the device containing the bore. The access window extends longitudinally from and beside the ring receiving groove formed by the alignment of the shaft and bore grooves to the exterior of the device and serves as the access point for threadable insertion of the retaining ring. The encapsulated design provides greater strength and eliminates the need for two separate retaining rings to prevent relative movement in two directions.

7 Claims, 20 Drawing Figures

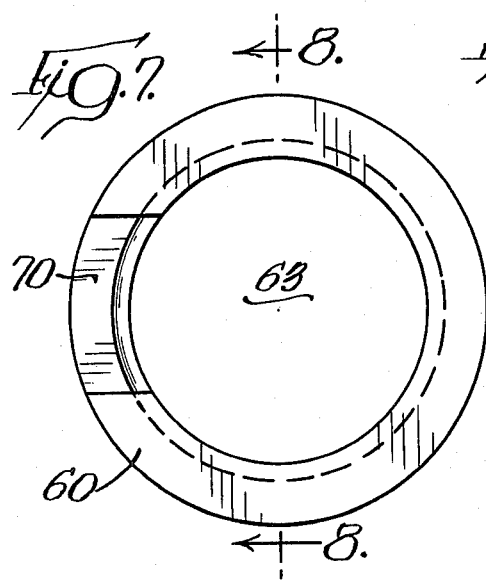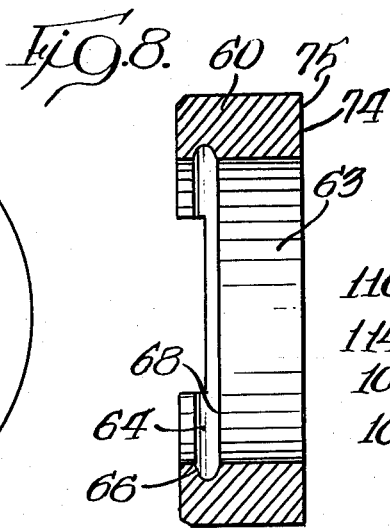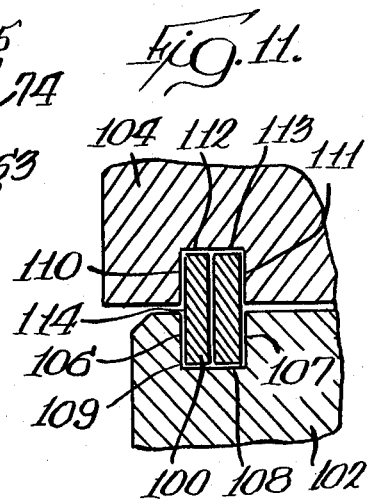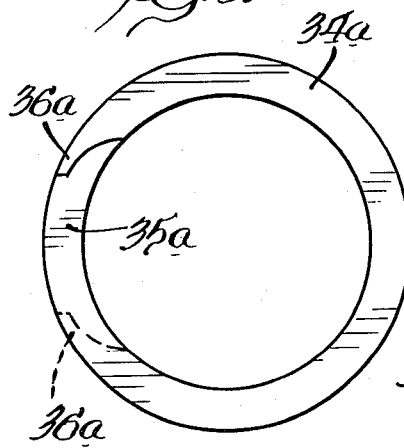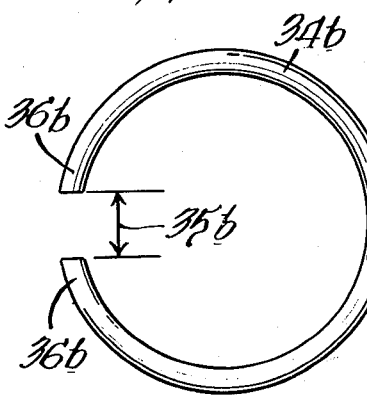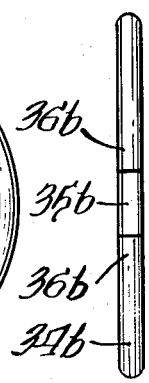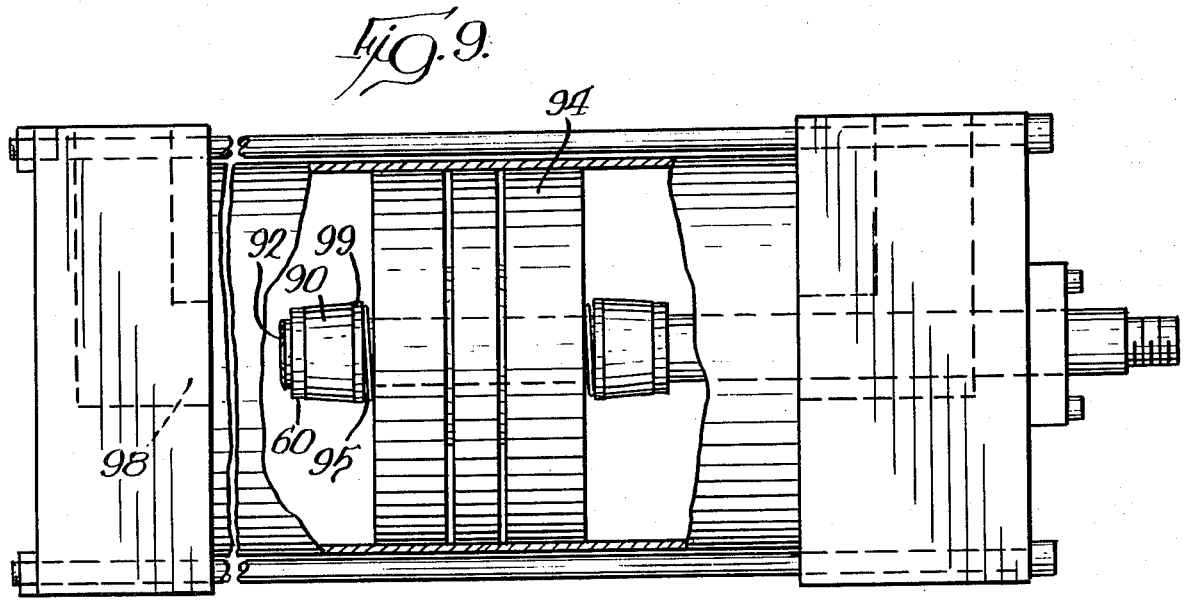

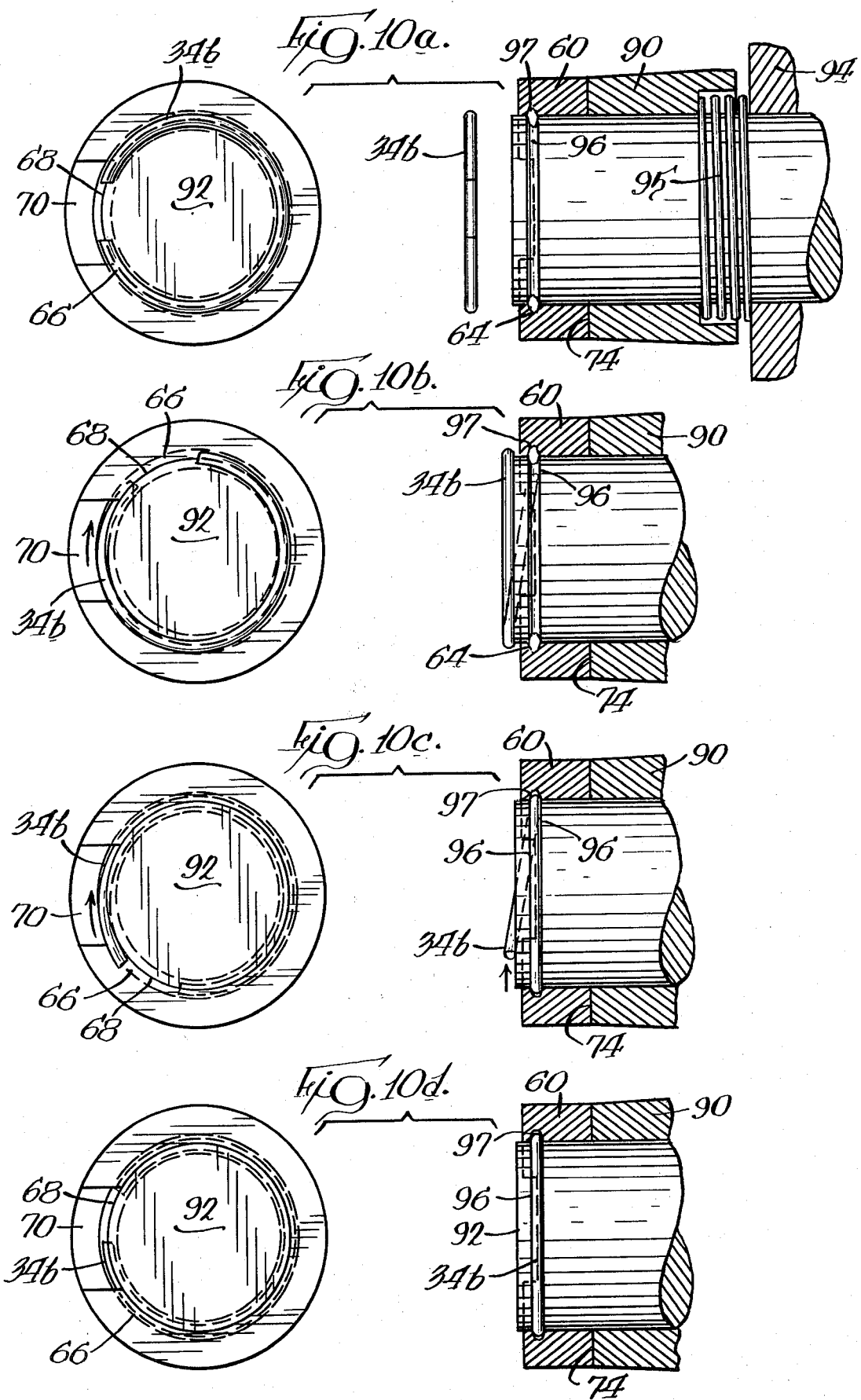

RETAINING RING LOCKING DEVICE

This is a continuation of application Ser. No. 128,358 filed Mar. 6, 1980.

BACKGROUND OF THE INVENTION

1. Field of the Invention

This invention relates to a retaining ring locking device for preventing relative movement of two adjacent structures.

2. Description of the Prior Art

There are many applications in which it is desired to prevent relative movement of two adjacent structures. A typical example is a shaft mounted within a bore located within a structure. The most accepted manner of preventing relative movement of the two structures is to provide grooves on the shaft such that the grooves reside outside the bore of the device. Retaining rings of known construction are then inserted into the grooves with a portion of the ring projecting out of the groove for abutment by the device to prevent the shaft from moving relative to the bore. The grooves must be machined to very close tolerances and positioned where the shaft exits the bore so that there will be minimum travel between the two parts once the retaining rings are assembled in the grooves.

Such a method of preventing relative movement suffers distinct disadvantages. In order to prevent longitudinal relative movement of a shaft within a bore in two directions, it is normally necessary to employ the use of two separate retaining rings, one on either side of the device. In applications where space is at a premium, this method may not even be feasible. Furthermore, nonencapsulated rings inserted in grooves are subject to bending forces, which may cause the ring to expand out of the groove. It is also difficult to produce retaining rings which have very close tolerances; therefore, it is difficult to completely prevent relative movement of the two parts, particularly in machines demanding close tolerances and accurate fits.

Accordingly, it is an object of this invention to provide a retaining ring locking device in which the ring is encapsulated so as to minimize bending forces.

A further object is to provide a retainer for a ring locking device which requires the use of only one ring to prevent longitudinal relative movement of two mated structures in two directions.

SUMMARY OF THE INVENTION

The objects of the invention are achieved by providing a retaining ring in an encapsulated design.

According to the present invention, a groove is machined circumferentially inward on a shaft which forms a part of a ring-receiving groove. Another circumferential groove is machined outwardly in a bore located within a device to form another part of the ring-receiving groove. An access window is formed which may be located on either the shaft or on the device in which the bore is located. The access window is open such that when the shaft and bore grooves are aligned the access window extends longitudinally from the ring-receiving groove to the exterior of the structure. An end of a retaining ring is inserted into the ring-receiving groove through the access window and is threaded into the structure so as to fit inside the ring-receiving groove. A flat retaining ring of conventional construction may be used or a round wire retaining ring, drawn to close tolerances, could alternatively be used.

BRIEF DESCRIPTION OF THE DRAWINGS

FIG. 3 is an elevational view of a flat conventional retaining ring forming a part of this invention;

FIG. 4 is an end view of a flat retaining ring illustrated in FIG. 3;

FIG. 5 is an elevational view of a wire retaining ring forming a part of this invention;

FIG. 6 is an end view of a wire retaining ring illustrated in FIG. 5;

FIG. 7 is an elevational view of a retainer collar of the present invention;

FIG. 8 is a partial sectional view taken along lines 8—8 of FIG. 7;

FIG. 9 is an elevational view of a piston and cylinder device incorporating the retaining ring locking device, with a portion of the cylinder wall broken away to show the interior wherein the structure of the retainer collar and ring locking device may be utilized;

FIG. 10a, b, c and d are each an end elevational view of a retaining ring and a sectional view of the retainer collar associated with the piston and cylinder device of FIG. 9; and FIG. 11 is a sectional view of a bore and shaft with the access window omitted with which the retaining ring locking device may be utilized.

DESCRIPTION OF THE PREFERRED EMBODIMENT

Figure 1A:
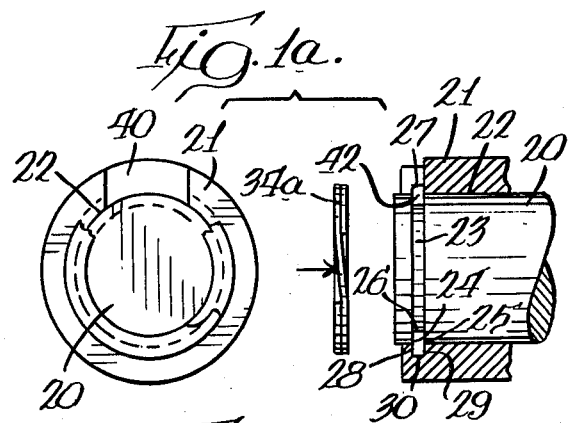
FIG. 1a, b, c and d are each an end elevational view of a retaining ring and a sectional view of a bore and shaft with which the retaining ring locking device may be utilized.
Figure 2A:
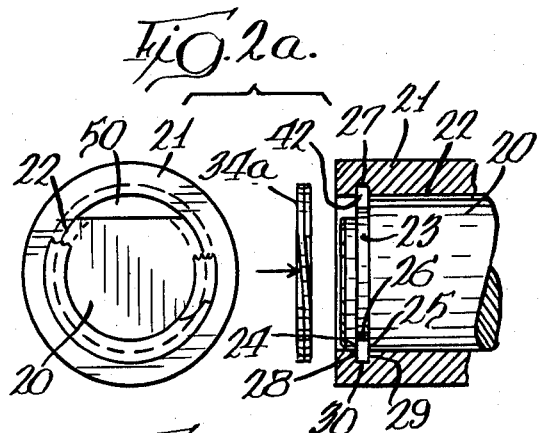
FIG. 2a, b, c and d are each an end elevational view of a retaining ring and a sectional view of a bore and shaft with which the retaining ring locking device may be utilized.

Referring to FIGS. 1 and 2, the retaining ring locking device is illustrated being used to prevent relative movement of a shaft 20 and a device 21 having a bore 22. A shaft groove 23, defined by side walls 24 and 25 and a bottom wall 26 is machined on the shaft 20. A corresponding bore groove 27, defined by side walls 28 and 29 and bottom wall 30 is machined outwardly within the bore 22 of the device 21. The profile of the two grooves depends upon the particular type of retaining ring used in the particular application.

Referring to FIGS. 3, 4, 5 and 6, two types of retaining rings 34 are illustrated. The flat retaining ring 34a, as shown in FIGS. 3 and 4, is made of resilient matal, for example, steel from which springs are made, and shaped so as to overlap in a two-ply construction, except at a small gap portion 35a. The ring is extensible in an axial direction so as to spread the plies of the ring, and will return to its original shape when released. When the ring 34a is extended axially to form a helix of greater pitch than the ring possesses when collapsed against itself, the diameter of the ring 34a can be made larger or smaller, depending upon the particular application for which it will be used. The ends 36a of the ring 34a are tapered so as to provide a means for grasping the ring to expand the plies. However, the flat retaining ring 34a is subject to bending moments at the gap portion 35a when used in high pressure applications due to the cross-over of the plies. Hence, the effective life of the flat ring 34a is relatively short. Further, it is difficult to manufacture the flat ring 34a to close tolerances. As shown in FIG. 4, the profile of the flat retaining ring is rectangular in shape.

The wire retaining ring 34b of FIG. 4 is constructed of steel wire and is of single ply, C-shaped construction with a small gap 35b. The wire ring 34b can be drawn to close tolerances, hence, this ring is preferable for use in applications where minimal travel between parts is desired. Further, the wire ring 34b does not have a crossover point, and hence is not subject to bending moments which cause premature fatigue of the ring. It will be noted that the profile of wire retaining ring 34b is different than that of flat retaining ring 34a, in that it is circular in cross-section.

Referring again to FIG. 1, the flat retaining ring 34a is illustrated in various phases of insertion into a ring receiving groove 42 formed by the alignment of the bore groove 27 and the shaft groove 23. The device 21 includes an access window defined by an opening 40 which extends longitudinally from the ring receiving groove 42 to the exterior of the device 21. The access window 40 is made sufficiently large to permit easy insertion and removal, to be explained below, of the retaining ring 34a. However, the access window 40 should not be made so large as to impair the retaining ability of the retaining ring 34a. Typical sizes for the access window 40 are ½" width for a ⅝" diameter shaft and ¾" width for a 1" diameter shaft.

Figure 1B:
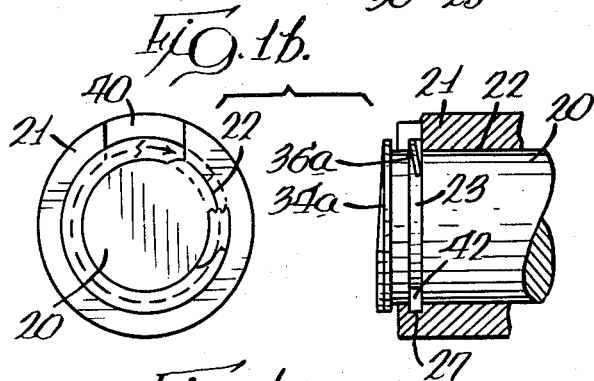
Figure 2B:
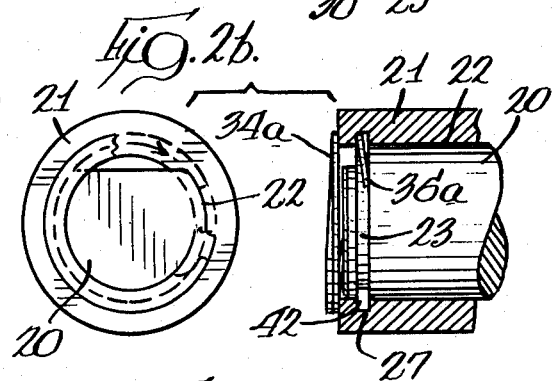
Figure 1C:
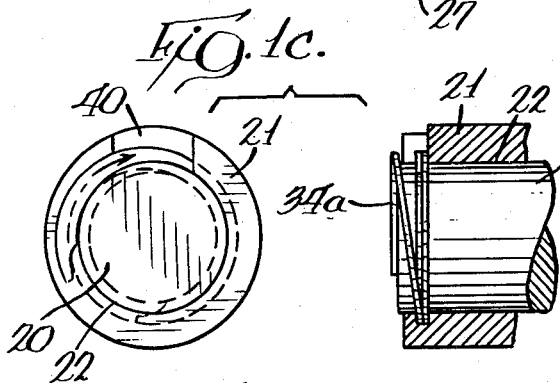
Figure 1D:
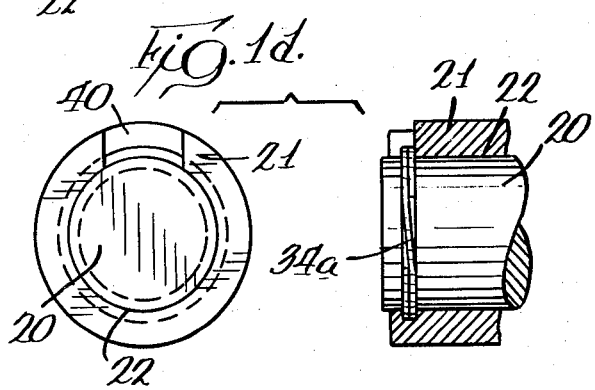

The plies of ring 34a are spread and an end 36a of the ring 34a is inserted into the ring receiving groove 42 formed by shaft groove 23 and bore groove 27 at the access window 40, as shown in FIG. 1b. The flat retaining ring 34a is then rotated until the entire ring is seated within the ring receiving groove 42, as shown in FIGS. 1c and 1d. The shaft 20 and the device 21 are consequently restrained from longitudinal relative movement by the flat retaining ring 34a. It will be noted that in order to insert the flat retaining ring 34a, the inner diameter of the ring 34a must be expanded to fit over the shaft 20. This is possible because the ring 34a is extensible in the circumferential direction of the ring thereby permitting expansion of the inner diameter.

Figure 2C:
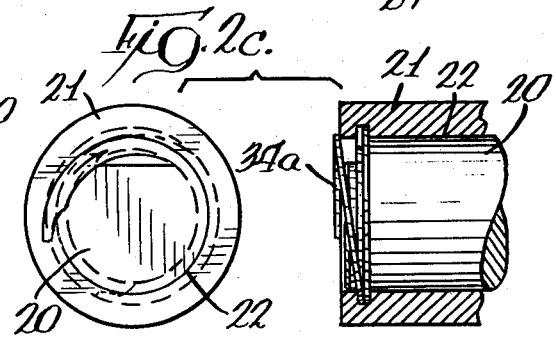
Figure 2D:
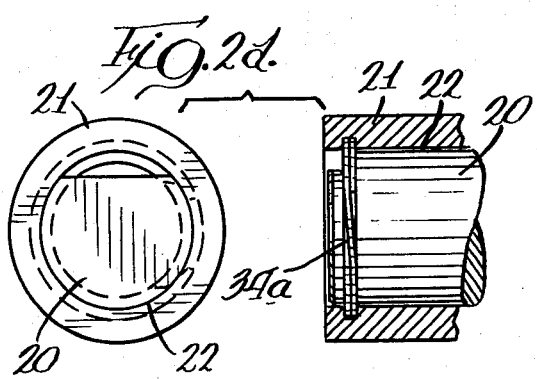

Referring now to FIGS. 2a through 2d, the retaining ring locking device is illustrated being used with a bore and shaft wherein the shaft includes the access window. Because many of the structures are similar to that described in conjunction with FIG. 1, common reference numerals will refer to like structures. An insertion access portion 50 is located on the shaft 20 instead of on the device 21 as was the case in FIG. 1. The ring 34a is inserted into the access window 50 and is rotated into the ring receiving groove 42 in the same manner as before, and as shown in FIGS. 2c and 2d. It will be noted that for this application, the outer diameter of the retaining ring 34a must be made smaller to fit within the bore 22 of the device 21. The effect is to prevent longitudinal relative movement of the shaft 20 and within the bore 22.

The wire retaining ring 34b is installed in the same manner as flat retaining ring 34a, the only difference being the profile of the ring receiving groove 42 is somewhat diamond-shaped to provide enough clearance to easily insert the ring 34b. Furthermore, the retaining ring 34b need not be rotated as far due to its single ply construction. The wire retaining ring 34b can be drawn to closer tolerances and is not subject to premature fatigue due to bending moments as the flat retaining ring 34a is; therefore, it is preferable to use the wire retaining ring 34b in applications requiring minimal travel between the parts or where large forces are encountered.

Referring to FIGS. 7 and 8, a collar 60 for restraining relative moment in one direction of a load on a shaft is illustrated. A collar 60 is shown as generally being of circular cross-section with a bore 63 extending axially throughout. A collar groove 64 is formed by a flange 66 extending from a ring seating surface 68. The space between the opposite ends of the flange 66 is used as an access window 70. A load abutment surface 74 is located on a back side 75 of the collar 60.

Referring now to FIGS. 9 and 10, the retaining ring locking device of the present invention will be illustrated by its use in a piston cushioning device in a cylinder. For a detailed discussion of the piston cushioning device as shown in FIG. 9, reference should be made to the co-pending application by the same inventor, Ser. No. 128,357 entitled EXPANDABLE CUSHION PLUNGER, filed Mar. 6, 1980.

For this application, it is desired to mount a cushion sleeve 90 in floating relation on a piston rod 92 adjacent a piston 94. A spring 95 urges the cushion sleeve 90 against the retaining collar 60 which is held in place by the retainer ring, which is this case is the wire retainer ring 34b. To mount the collar 60 on the piston rod 92, a shaft groove 96 is ground onto the piston rod 92. The profile of the shaft groove 96 and the collar groove 64 depends upon the type of retaining ring used, i.e., a rectangular profile for flat retaining ring 34a, or a diamond-shaped profile for a wire retaining ring 34b. The collar 60 is slipped over the piston rod 92 so that the collar groove 64 is aligned with the shaft groove 96. An end of the wire ring 36b is inserted into the ring receiving groove 97 formed by collar groove 64 and shaft groove 96 at the insertion access window 70, as shown in FIG. 10b. The wire retaining ring 34a is then rotated until the entire ring is seated on the ring seating surface 68 and positioned within the flange 66, as shown in FIGS. 10c and 10d. The collar 60 is consequently fixed in position on the piston rod 92, thereby restraining the cushion sleeve 90 against movement due to the urging of spring 95. The collar 60 provides an enlarged surface, i.e., the load abutment surface 74, perpendicular to the shaft axis against which the cushion sleeve 90 can rest. The collar 60 thereby serves the dual purpose of aligning the cushion sleeve 90 concentric with the piston rod 92 and encapsulating the retaining ring 34a.

Assuming the piston 94 is travelling to the left in response to pressurized fluid acting on the right side of the piston 94, the cushion sleeve 90 and the collar 60 approach a fluid exit port 98. As the collar 60 enters the fluid exit port 98, an annular orifice is formed which restricts the flow of fluid, thereby trapping the fluid and building up pressure to slow down the piston 94. The cushion sleeve 90 is shaped to make a close fit at its widest point with the port 98 such that the annular orifice decreases as the cushion sleeve 90 continues to enter the port 98. The cushion sleeve 90 is constructed of a material which expands in response to pressure acting within a skirt portion 99 located adjacent the piston 94. Therefore, as the cushion sleeve 90 restricts the fluid flow of the port 98, pressure is built up which expands the cushion sleeve 90 to further restrict the fluid flow and provide additional cushioning. The piston 94 is thereby slowed down to a very small velocity when it completes its stroke, minimizing undesirable impact.

As pressurized fluid enters the exit port 98 to begin a new piston stroke to the left, the cushion sleeve 90 is pushed back against the force of the spring 95 to abut the piston 94, thereby increasing the size of the annular orifice to permit rapid return stroke of the piston 94. Because the collar 60 is locked onto the piston rod 92, the cushion sleeve 90 is spaced away from the load abutment surface 74. When the piston 94 has travelled sufficiently to the left to reduce the pressure on the cushion sleeve 90, the spring 95 forces the cushion sleeve 90 to move back against the load abutment surface 74.

Referring now to FIG. 11, a flat retaining ring 100 is illustrated as preventing movement between a shaft 102 and a device 104. The shaft 102 has side walls 106 and 107 and bottom wall 108 to form a shaft groove 109. A device groove 113 is defined by side walls 110 and 111 and by a bottom wall 112. The alignment of the shaft groove 109 and the device groove 113 form a composite groove 114 into which the retainer ring 100 is inserted. The access window is not shown for purposes of simplifying the illustration.

The advantages of the encapsulated design of the retaining ring locking device will be described with the assumption that a force is acting upon the shaft 102 attempting to move it to the right relative to the device 104. Because the flat retaining ring 100 cannot be machined to close tolerances, a certain amount of travel will exist between the shaft 102 and the device 104 due to clearance between the composite groove 114 and the retaining ring 100. Therefore, the shaft 102 will move a very small distance with respect to the device 104 until the retaining ring 100 engages the side wall 110 of device groove 113. The retaining ring will bend until it contacts the side wall 111 of the device groove 113. The retaining ring 100 is prevented from further bending because of the encapsulated design, and hence the only force acting upon the ring 100 is shear force. It is generally known that the force required to shear the ring 100 is normally much greater than the force required to bend the ring 100, hence, the encapsulated design greatly increases the retaining strength over prior non-enclosed designs. The clearances between the parts can be minimized by utilizing a wire retaining ring instead of a flat ring.

It can be seen that only one ring is needed to prevent relative longitudinal movement of two structures, whereas in the prior art it was necessary to utilize two retaining rings located adjacent one of the structures to prevent movement in two directions. Furthermore, because it is very difficult to machine grooves with perfectly parallel walls which have true 90° angles with the bottom wall, retaining rings are subject to forces which can cause them to expand out of the groove. Encapsulation of the retaining ring minimizes expansion and eliminates the need for two retainer rings, thereby decreasing costs and increasing effectiveness.

I claim:

1. Retaining ring structure for holding a shaft within a bore in a device against longitudinal relative movement, comprising:
    a retaining ring;
    means on said shaft defining an external circumferential groove having axially opposite sidewalls; and
    means on said device defining an internal circumferential bore groove having axially opposite sidewalls complementary to said shaft groove to define a substantially closed ring receiving groove means when the shaft and bore grooves are disposed radially opposite each other, said shaft having a chordal portion contiguous its end removed so as to provide with said device at least one access opening extending axially inwardly from an end thereof to said ring receiving groove means for exposing a portion of said ring receiving groove means from said end whereby the radially unexpanded retaining ring may be threaded from axially outwardly of said end through said opening into said ring receiving groove means for locking said device and shaft against both axially inward and axially outward displacement.

2. Retaining ring structure for holding a shaft within a bore in a device against longitudinal relative movement, comprising:
    a retaining ring having a circular cross section;
    means on said shaft defining an external circumferential groove having axially opposite sidewalls; and
    means on said device defining an internal circumferential groove in said bore having axially opposite sidewalls complementary to said shaft groove to define a substantially closed ring receiving groove having a cross-sectional configuration different from that of said circular retaining ring when the shaft and bore grooves are disposed radially opposite each other, said device having at least one access opening extending axially inwardly from an end thereof to said ring receiving groove for exposing a portion of said ring receiving groove from said end whereby the radially unexpanded retaining ring may be threaded from axially outwardly of said end through said opening into said ring receiving groove for engaging said sidewalls of the complementary circumferential grooves to lock said device and shaft against both axially inward and axially outward displacement.

3. The retaining ring structure of claims 1 or 2 wherein each said opening is large enough to permit insertion of said retaining ring without exceeding the elastic limit of said retaining ring.

4. The retaining ring structure of claims 1 or 2 wherein the width of said opening is substantially ½ inch for a ⅝-inch diameter shaft and ¾-inch width for a 1-inch diameter shaft.

5. The retaining ring structure of claims 1 or 2 wherein said device comprises an annular collar having an axis coincident with the axis of the shaft, and an exterior abutment surface substantially perpendicular to said axes for aligning another member about the shaft when abutted against said surface.

6. The retaining ring structure of claims 1 or 2 wherein said retaining ring substantially fills said ring receiving groove means.

7. The retaining ring structure of claim 2 wherein said ring receiving groove is diamond shaped.

* * * * *

UNITED STATES PATENT AND TRADEMARK OFFICE
CERTIFICATE OF CORRECTION

PATENT NO. : 4,405,251

DATED : September 29, 1983

INVENTOR(S) : Abel E. Kolchinsky, John Bowbin, Wayne Davis

It is certified that error appears in the above-identified patent and that said Letters Patent is hereby corrected as shown below:

[75] correct name of second inventor to read:

-- John Bowbin --.

Signed and Sealed this

Seventeenth Day of July 1984

[SEAL]

Attest:

GERALD J. MOSSINGHOFF

Attesting Officer     Commissioner of Patents and Trademarks